(12) United States Patent
Jin et al.

(10) Patent No.: US 11,159,233 B2
(45) Date of Patent: Oct. 26, 2021

(54) MEASURING DEVICE FOR POLARIZATION-MAINTAINING OPTICAL FIBER SPINDLE DIFFERENTIAL DELAY

(71) Applicant: Zhejiang University, Hangzhou (CN)

(72) Inventors: Xiaofeng Jin, Hangzhou (CN); Donglin Qin, Hangzhou (CN); Chenghui Zhang, Hangzhou (CN); Xiangdong Jin, Hangzhou (CN); Xianbin Yu, Hangzhou (CN); Shilie Zheng, Hangzhou (CN); Xianmin Zhang, Hangzhou (CN); Bo Cong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/194,290

(22) Filed: Mar. 7, 2021

(65) Prior Publication Data

US 2021/0226700 A1    Jul. 22, 2021

Related U.S. Application Data

(63) Continuation of application No. PCT/CN2020/073568, filed on Jan. 21, 2020.

(30) Foreign Application Priority Data

Mar. 28, 2019    (CN) .......................... 201910242806.4

(51) Int. Cl.
*H04B 10/079* (2013.01)
*G02B 6/024* (2006.01)
(Continued)

(52) U.S. Cl.
CPC ......... *H04B 10/0795* (2013.01); *G02B 6/024* (2013.01); *H04B 10/25* (2013.01); *H04B 10/503* (2013.01)

(58) Field of Classification Search
CPC .................................................. H04B 10/0795
See application file for complete search history.

(56) References Cited

U.S. PATENT DOCUMENTS

| 9,115,993 B1 | 8/2015 | Dahlgren | |
|---|---|---|---|
| 2011/0277552 A1* | 11/2011 | Chen | G01J 4/00 73/763 |

(Continued)

FOREIGN PATENT DOCUMENTS

| CN | 1584649 A | | 2/2005 | |
|---|---|---|---|---|
| CN | 102494681 A | * | 6/2012 | G01C 19/72 |

(Continued)

OTHER PUBLICATIONS

ISR of PCT/CN2020/073568.
(Continued)

*Primary Examiner* — Nathan M Cors

(57) ABSTRACT

A measurement device for polarization-maintaining optical fiber spindle difference delay is provided. The measurement device comprises a polarization-maintaining fiber (PM) Sagnac interferometer, a signal generator, a microwave detector, a microprocessor. The PM Sagnac interferometer comprises a laser, a photoelectric modulator, and a PM fiber coupler that are connected in sequence. The PM Sagnac interferometer further comprises an optical fiber interface J1 and an optical fiber interface J2 arranged at the two output ends of the PM fiber coupler, a PM fiber to be measured located between the fiber interface J1 and the fiber interface J2, and a photodetector arranged at the other output end of the PM fiber coupler.

6 Claims, 2 Drawing Sheets

(51) Int. Cl.
*H04B 10/25* (2013.01)
*H04B 10/50* (2013.01)

(56) References Cited

U.S. PATENT DOCUMENTS

2016/0258743 A1* 9/2016 Yao ..................... G01B 11/161
2016/0273999 A1* 9/2016 Hotate .................. G01M 11/39
2017/0307474 A1* 10/2017 Thevenaz .......... G01M 11/3181

FOREIGN PATENT DOCUMENTS

| CN | 102494681 A | 6/2012 |
| CN | 206496890 U | 9/2017 |

OTHER PUBLICATIONS

Guo, Anhua et al. "Research and Application of Optical Fiber Sagnac Loop", Electro-Optic Technology Application, vol. 28, No. 6, Dec. 31, 2013.

\* cited by examiner

MEASURING DEVICE FOR POLARIZATION-MAINTAINING OPTICAL FIBER SPINDLE DIFFERENTIAL DELAY

CROSS-REFERENCE TO RELATED APPLICATIONS

This application is a continuation of PCT Patent Application No. PCT/CN2020/073568, filed on Jan. 21, 2020, entitled "Measuring Device for Polarization-Maintaining Optical Fiber Spindle Differential Delay," which claims foreign priority of China Patent Application No. 201910242806.4, filed Mar. 28, 2019 in the China National Intellectual Property Administration, the entire contents of which are hereby incorporated by reference in their entireties.

TECHNICAL FIELD

The present disclosure relates to the technical field of measuring optical fiber delay, in particularly to a measuring device for polarization-maintaining optical fiber spindle differential delay.

BACKGROUND

Polarization-maintaining optical fiber has a wide range of applications in the field of optical fiber communication and sensing. It can be used as a transmission element or a sensing element. As a transmission element, it shows good polarization maintaining ability. As a sensing element, it is widely used in distributed stress sensors, fiber optic gyroscopes, fiber optic current transformers or the like. It is of great significance to study the transmission and sensing characteristics of the polarization-maintaining optical fiber. While the transmission and sensing characteristics of the polarization-maintaining optical fiber are usually expressed as changes in delay.

The measurement of optical fiber delay is involved in optical fiber testing, optical cable laying, and fault checking. In various optical fiber experiments and projects, the measurement of optical fiber delay is also involved. It can be said that accurate optical fiber delay measurement is extremely important in almost all optical fiber communication and optical fiber sensing systems.

Traditional optical fiber delay measurement methods include optical time domain reflection principle (OTDR), low coherent reflection principle (OLCR) and optical frequency domain reflection measurement principle (OFDR).

OTDR is widely used in the field of optical fiber network communication to measure the length of the optical fiber and detect the position of the optical cable breakpoint, but due to the influence of the method itself, the test accuracy can only reach the microsecond level.

OLCR has high test accuracy. The accuracy of OLCR can reach the femtosecond level. The structure of OLCR is simple, which is convenient to make a portable instrument. However, the dynamic range of OLCR is relatively small, and the maximum measurement range is only a few centimeters. At the same time, the polarization states reflected by the two arms of the interferometer are required to match, otherwise the measurement accuracy of OLCR will be affected.

The measurement accuracy of OFDR is higher than that of OTDR, which can reach the picosecond level. The measurement range of OFDR is larger than that of OLCR, and can reach up to several kilometers, which has higher practicability. However, OFDR requires a fixed-length optical fiber as a reference optical path, which is easily affected by temperature and reduces the measurement accuracy.

SUMMARY

In view of above problems, the present disclosure provides a measurement device for polarization-maintaining optical fiber spindle difference delay. The measurement accuracy of the measurement device can be up to the picosecond level, and the dynamic range up to kilometer level.

The technical features are specified as follows.

A measurement device for polarization-maintaining optical fiber spindle difference delay is provided. The measurement device comprises a polarization-maintaining fiber (PM) Sagnac interferometer, a signal generator, a microwave detector, a microprocessor.

The PM Sagnac interferometer comprises a laser, a photoelectric modulator, and a PM fiber coupler that are connected in sequence. The PM Sagnac interferometer further comprises an optical fiber interface J1 and an optical fiber interface J2 arranged at the two output ends of the PM fiber coupler, a PM fiber to be measured located between the fiber interface J1 and the fiber interface J2, and a photodetector arranged at the other output end of the PM fiber coupler. After the low-coherence linearly polarized light emitted by the laser is carried by the photoelectric modulator with a radio-frequency (RF) signal, the PM fiber coupler divides low-coherence linearly polarized light into two output lights. A first output light of the two output lights along the fast axis of the PM fiber coupler enters the to-be-measured PM fiber through the optical fiber interface J1 and transmits along the fast axis of the to-be-measured PM fiber. A second output light of the two output lights along the fast axis of the PM fiber coupler is coupled to the slow axis of the to-be-measured PM fiber. The two output lights are transmitted in opposite direction and in different axis. The first output light in the fast axis of the to-be-measured PM fiber is redirected into the slow axis of the to-be-measured PM fiber through the optical interface J2 when the first output light arrives at another end of the to-be-measured PM fiber. The second output light in the slow axis of the to-be-measured PM fiber will not change its transmission axis when it enters the slow axis of the PM fiber coupler. At last, the two output lights are overlaid and output, and the optical signal of the overlaid light is converted into electrical signal by the photodetector.

The signal generator generates a frequency sweeping RF signal, and the frequency sweeping RF signal is modulated onto the optical signal by the photoelectric modulator.

The microwave detector is arranged at the output end of the photodetector and is configured to detect the power of the RF signal output by the photodetector.

The microcontroller is connected to the microwave detector, and is configured to calculate the optical delay generated by the PM optical fiber according to the output signal of the microwave detector.

The optical fiber spindle differential delay is calculated by the microcontroller based on the following formula:

$$\tau = \frac{1}{|f_{RF0} - f_{RF1}|}$$

Where, $f_{RF0}$ and $f_{RF1}$ are the frequency values at which the voltage output by the adjacent microwave detector is 0.

The provided device uses different propagation constants of light in the fast axis and slow axis of the PM fiber to generate a delay difference to measure the length of the to-be-measured fiber. The structure of the Sagnac interferometer is adopted, and the reference optical path is not need. The influence of temperature on measurement accuracy is reduced. At the same time, combined with the time delay measurement method based on microwave photon technology, the measurement accuracy of the provided device can reach the picosecond level and the dynamic range of which can be the kilometer level.

BRIEF DESCRIPTION OF THE DRAWINGS

In order to more clearly describe the technical solutions in the embodiments of the present disclosure, the following will briefly introduce the drawings that need to be used in the description of the embodiments. Obviously, the drawings in the following description are only exemplary embodiments of the present disclosure. For those of ordinary skill in the art, other drawings may be obtained based on these drawings without creative work.

FIG. 3A-3B are schematic diagrams of the fiber interface, wherein, FIG. 3A shows the connection mode for the fiber interface J2; FIG. 3B shows the connection mode for the fiber interface J1.

DETAILED DESCRIPTION OF THE DISCLOSURE

In order to describe the present disclosure more specifically, the technical solution of the present disclosure will be described in detail below with reference to the drawings and specific embodiments.

Figure 1:
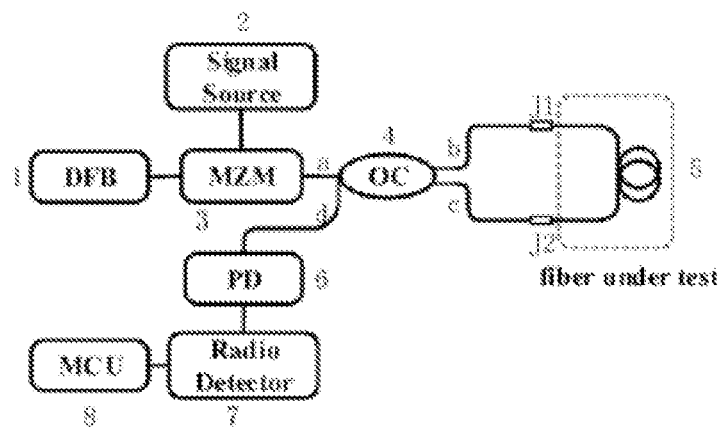
FIG. 1 is a schematic diagram of the measurement device for polarization-maintaining optical fiber spindle differential delay.

As shown in FIG. 1, a measurement device for polarization-maintaining optical fiber spindle difference delay is provided. The measurement device comprises a laser (DFB) 1, a signal generator (Signal Source) 2, a photoelectric modulator (MZM) 3, a PM fiber coupler (OC) 4, a fiber interface J1, a fiber interface J2, a to-be-measured PM fiber 5, a photoelectric detector (PD) 6, a microwave detector (Radio Detector) 7 and a microcontroller (MCU) 8.

Figure 2:
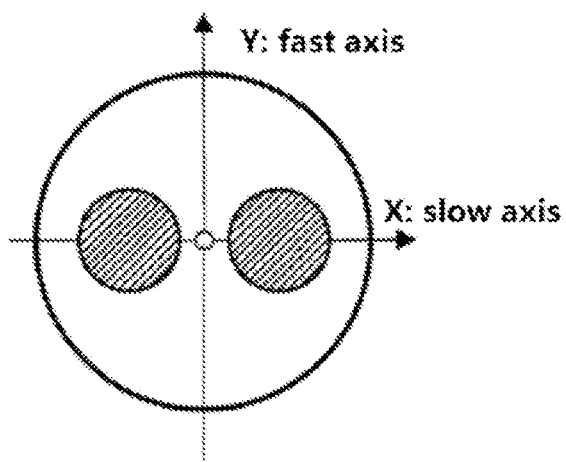
FIG. 2 is a schematic diagram of the PM fiber.
Figure 3A:
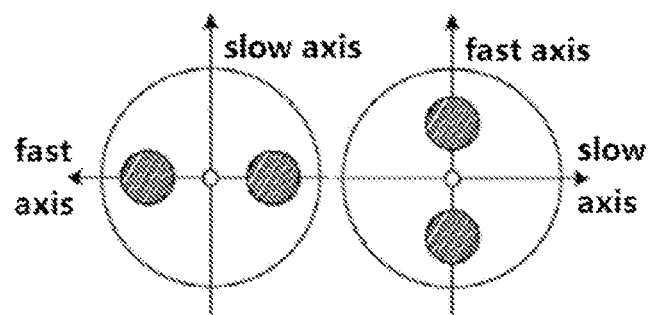
Figure 3B:
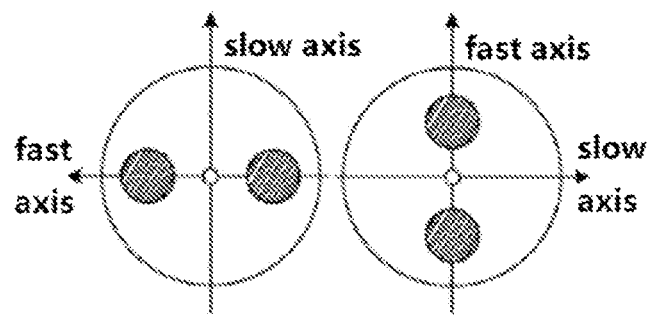

A Sagnac interferometer is formed by the laser 1, photoelectric modulator 3, the PM fiber coupler 4, the fiber interface J1, the fiber interface J2, the photoelectric detector 6 and the to-be-measured PM fiber 5. As shown in FIG. 2, the to-be-measured PM fiber 5 comprises two transmission axis, one is the fast axis, the other is the slow axis which is perpendicular to the fast axis. As shown in FIG. 3A and FIG. 3B, the fiber interface J1 and fiber interface J2 are configured to connect the PM fiber coupler 4 and the to-be-measured PM fiber 5. Via the fiber interface J1, the fast axis of the PM fiber coupler 4 is aligned with fast axis of the to-be-measured PM fiber 5, and the slow axis of the PM fiber coupler 4 is aligned with the slow axis of the to-be-measured fiber 5. Via the fiber interface J2, the fast axis of the PM fiber coupler 4 is aligned with the slow axis of the to-be-measured fiber 5, and the slow axis of the PM fiber coupler 4 is aligned with the fast axis of the to-be-measured fiber 5.

More specifically, the laser 1 is a broad-spectrum light source with a coherence length less than 30 μm. The coherence length of the laser 1 is much smaller than the optical path difference caused by the different propagation constants of the fast and slow axes of the PM fiber. Furthermore, the laser 1 emits linearly polarized light.

More specifically, the PM fiber coupler 4 is a 2×2, 3 dB PM fiber coupler, and the two optical fibers on the PM fiber coupler 4 that connecting to the fiber interface J1 and fiber interface J2 have identical length.

During operation, after the low-coherence linearly polarized light emitted by the laser 1 is carried with a RF signal via the photoelectric modulator 3, the PM fiber coupler divides the low-coherence linearly polarized light into two output lights. A first output light of the two output lights at port b of the PM fiber coupler 4 along the fast axis of the PM fiber coupler 4 enters the to-be-measured PM fiber through the optical fiber interface J1 and transmits along the fast axis of the to-be-measured PM fiber 4. A second output light of the two output lights at port c of the PM fiber coupler 4 along the fast axis of the PM fiber coupler 4 is coupled to the slow axis of the to-be-measured PM fiber 5. The two output lights are transmitted in opposite direction and in different axis. The first output light in the fast axis of the to-be-measured PM fiber 5 is redirected into the slow axis of the to-be-measured PM fiber 5 through the optical interface J2 when the first output light arrives at another end of the to-be-measured PM fiber 5. The second output light in the slow axis of the to-be-measured PM fiber 5 will not change its transmission axis when it enters the slow axis of the PM fiber coupler 4. At last, the two output lights are overlaid and output through the port d of the PM fiber coupler 4, and the optical signal of the overlaid light is converted into electrical signal by the photodetector 6.

The frequency sweeping signals generated by the signal generator 2 are modulated onto the light and enter the PM fiber Sagnac interferometer. Since the propagation constants of the fast axis and the slow axis of the to-be-measured PM fiber are different, there is a time delay difference between the light on the two axes when the lights on the two axes arrive at the output end. The overlaid light signal is therefore converted into electrical signal. The amplitude of the converted signal carries the time delay information. Accordingly, the optical time delay generated by the to-be-measured PM fiber 6 can be calculated by the microwave detector 7 and the microcontroller 8.

The work principle of the measurement device for the PM optical fiber spindle differential delay is as follows.

The RF signal generated by the signal generator 2 may be expressed as:

$$V_{RF}(t) = V_{RF} \cos(\omega_{RF} t) \tag{1}$$

Where, $V_{RF}$ represents the amplitude of the RF signal; $\omega_{RF}$ represents the frequency of the RF signal.

The bias voltage applied to the photoelectric modulator is:

$$V_{in}(t) = V_{DC} + V_{RF} \cos(\omega_{RF} t) \tag{2}$$

The resulting light phase change is:

$$\varphi_{bias}(t) = \pi V_{DC}/V_\pi + V_{RF} \cos(2\pi f_{RF} t)/V_\pi \tag{3}$$

Where, $V_{DC}$ is the DC (direct voltage) provided by the regulated DC power supply, and $V_\pi$ is the half-wave voltage of the photoelectric modulator. The first part of the formula (3) is the phase change produced by the DC bias, and the second part is the phase change produced by the modulation signal. When the initial phase is $$\frac{\pi}{2},$$

and the input signal is a small signal, the changes of the laser power tend to be liner. Therefore, under normal circumstances, the bias point of the photoelectric modulator must be placed at the half-wave voltage, that is, $$V_{DC} = \frac{V_\pi}{2},$$

so that the first-order electrical signal gain used in the product can be maximum value, and at the same time can well suppress high-order harmonic signals.

The laser light modulated by the microwave can be expressed at the output end of the photoelectric modulator as follows:

$$P_{out}(t) = \frac{1}{2}\alpha_{loss}P_0\left[1 + \cos\left(\frac{\pi V_{DC}}{V_\pi} + \frac{\pi V_{RF}\cos(2\pi f_{RF}t)}{V_\pi}\right)\right] \quad (4)$$

Where, $\alpha_{loss}$ is the loss of the photoelectric modulator; $P_0$ is the light intensity input by the laser; $P_{out}(t)$ is the light intensity output by the photoelectric modulator. The light output by the photoelectric modulator is divided into two output lights, by a 2×2, 3 dB PM fiber coupler, to transmit along different axes of the PM fiber. A first output light of the two output lights is transmitted along the fast axis of the PM fiber, while a second output light of the two output lights is coupled to the slow axis of the to-be-measured PM fiber via a polarization controller. The light signals in the fast and slow axes of the PM fiber can be expressed as follows.

$$P_{fast} = \frac{1}{4}\alpha_{loss}P_0\left[1 + \cos\left(\frac{\pi V_{DC}}{V_\pi} + \frac{\pi V_{RF}\cos(2\pi f_{RF}t + \Delta\varphi_f)}{V_\pi}\right)\right] \quad (5)$$

$$\Delta\varphi_f = 2\pi f_{RF}\tau_f$$

$$P_{slow} = \frac{1}{4}\alpha_{loss}P_0\left[1 + \cos\left(\frac{\pi V_{DC}}{V_\pi} + \frac{\pi V_{RF}\cos(2\pi f_{RF}t + \Delta\varphi_s)}{V_\pi}\right)\right] \quad (60)$$

$$\Delta\varphi_s = 2\pi f_{RF}\tau_s$$

Where, $\Delta\varphi_f$ is the amount of phase change produced by the RF signal in the fast axis; $\Delta\varphi_s$ is the amount of phase change produced by the RF signal in the slow axis; $\tau_f$ is the time delay of the RF signal in the fast axis; $\tau_s$ is the time delay of the RF signal in the slow axis. Since the laser is a low-coherence source, the following condition is meet:

$$\tau \cdot f_{RF} \cdot L > \frac{\lambda_0^2}{\Delta\lambda} \quad (7)$$

Where, $f_{RF}$ is the frequency of the RF signal; L is the beat length of the to-be-measured PM fiber; $\tau$ is the time delay difference generated when light propagates on the fast axis and the slow axis of the to-be-measured PM fiber. Therefore, the two output lights transmitting along the fast axis and the slow axis are overlaid and output by the PM fiber coupler, and the output optical signal is sent to the photodetector. Ignoring the DC component, the output current of the first-order signal can be obtained as:

$$I_f = \eta\alpha_{loss}P_0 J_1\left(\frac{\pi V_\pi}{V_\pi}\right)[\cos(2\pi f_{RF}t + \Delta\varphi_s) + \cos(2\pi f_{RF}t + \Delta\varphi_f)] \quad (8)$$

$$= 2\eta\alpha_{loss}P_0 J_1\left(\frac{\pi V_\pi}{V_\pi}\right)\cos\left(\frac{\Delta\varphi_s - \Delta\varphi_f}{2}\right)$$

$$\cos\left(2\pi f_{RF}t + \frac{\Delta\varphi_s + \Delta\varphi_f}{2}\right)$$

Where, η is the photoelectric conversion efficiency and $\alpha_{loss}$ is the loss of the photoelectric modulator. The output signal of the photodetector is amplified and then input to the microwave detector to obtain the output signal:

$$V_{out} = |\cos[2\pi f_{RF}(\tau_s - \tau_f)]| \quad (9)$$

As what is apparent, the output voltage $V_{out}$ and the frequency $f_{RF}$ satisfy the cosine relationship. The period of the cosine function is related to the value of $(\tau_s - \tau_f)$. As long as the two adjacent frequency points $f_{RF0}$ and $f_{RF0}$ are measured, the delay amount can be obtained:

$$\tau = \tau_s - \tau_f = \frac{1}{|f_{RF0} - f_{RF1}|} \quad (10)$$

The provided device uses different propagation constants of light in the fast axis and slow axis of the PM fiber to generate a delay difference to measure the length of the to-be-measured fiber. The structure of the Sagnac interferometer is adopted, and the reference optical path is not need. The influence of temperature on measurement accuracy is reduced. At the same time, combined with the time delay measurement method based on microwave photon technology, the measurement accuracy of the provided device can reach the picosecond level and the dynamic range of which can be the kilometer level.

The above description of the embodiments is to facilitate those of ordinary skill in the art to understand and apply the present disclosure. It is obvious that those skilled in the art can easily make various modifications to the above-mentioned embodiments, and apply the general principles described here to other embodiments without creative efforts. Therefore, the present disclosure is not limited to the above-mentioned embodiments. According to the disclosure of the present disclosure, the improvements and modifications made to the present disclosure by those skilled in the art are within the scope of the present disclosure.

What is claimed is:

1. A measurement device for polarization-maintaining (PM) optical fiber spindle differential delay, comprising:
   a PM fiber Sagnac interferometer;
   a signal generator;
   a microwave detector; and
   a microprocessor;
   wherein the PM fiber Sagnac interferometer comprises a laser, a photoelectric modulator and a PM fiber coupler, which are connected in sequence;
   the PM fiber Sagnac interferometer further comprises a first fiber interface and a second fiber interface arranged respectively at a first output port and a second output port of the PM fiber coupler, a to-be-measured PM fiber located between the first fiber interface and the second fiber interface, and a photoelectric detector arranged at a third output port of the PM fiber coupler;

a low-coherence linear polarized light emitted by the laser is applied with a RF (radio frequency) signal by the photoelectric modulator, and divided into two output lights;

a first output light of the two output lights along a fast axis of the PM fiber coupler enters the to-be-measured PM fiber through the first fiber interface and a first end of the to-be-measured PM fiber, and transmits along the fast axis of the to-be-measured PM fiber; a second output light of the two output lights along the fast axis of the PM fiber coupler is coupled to a slow axis of the to-be-measured PM fiber through the second fiber interface and a second end of the to-be-measured PM fiber; the two output lights are transmitted in opposite directions and in different axes;

the first output light in the fast axis of the to-be-measured PM fiber is redirected into the slow axis of the to-be-measured PM fiber through the second fiber interface when the first output light arrives at the second end of the to-be-measured PM fiber; the second output light in the slow axis of the to-be-measured PM fiber will not change transmission axis when entering the slow axis of the PM fiber coupler;

the microwave detector is arranged at an output end of the photoelectric detector and is configured to detect the power of the RF signal output by the photoelectric detector;

the microprocessor is connected to the microwave detector, and is configured to calculate a light delay generated by the to-be-measured PM fiber according to an output signal of the microwave detector.

2. The measurement device according to claim 1, wherein the laser is a broad-spectrum light source with a coherence length less than 30 μm; the coherence length of the laser is much smaller than the optical path difference caused by different propagation constants of the fast and slow axes of the to-be-measured PM fiber.

3. The measurement device according to claim 2, wherein the laser emits linearly polarized light.

4. The measurement device according to claim 1, wherein the PM fiber coupler is a 2×2, 3 dB PM fiber coupler.

5. The measurement device according to claim 2, wherein two fibers on the PM fiber coupler that connect to the first fiber interface and second fiber interface have identical length.

6. The measurement device according to claim 1, wherein the optical fiber spindle differential delay is calculated by the microprocessor based on the following formula:

$$\tau = \frac{1}{|f_{RF0} - f_{RF1}|}$$

wherein, $f_{RF0}$ and $f_{RF1}$ are the frequency values at which the voltage output by the adjacent microwave detector is 0.

* * * * *